United States Patent [19]

Fishburn

[11] 4,350,437

[45] Sep. 21, 1982

[54] APPARATUS AND METHOD FOR PRODUCING IMAGES OF VARIOUS SIZES ON PHOTOSENSITIVE FILM

[75] Inventor: Charles E. Fishburn, Indianapolis, Ind.

[73] Assignee: National Printing Plate Company, Inc., Indianapolis, Ind.

[21] Appl. No.: 199,285

[22] Filed: Oct. 21, 1980

[51] Int. Cl.³ .............................................. G03B 27/68
[52] U.S. Cl. ......................................... 355/52; 355/77
[58] Field of Search ...................... 355/52, 84, 79, 133, 355/95, 77

[56] References Cited

U.S. PATENT DOCUMENTS

| 3,449,048 | 6/1969 | Allison | 355/95 X |
| 4,105,328 | 8/1978 | Wasson et al. | 355/52 X |
| 4,268,166 | 5/1981 | Byers | 355/52 X |

Primary Examiner—Richard A. Wintercorn
Attorney, Agent, or Firm—Jenkins, Coffey, Hyland, Badger & Conard

[57] ABSTRACT

An apparatus for producing images of various sizes on photosensitive film from either a photographic negative or positive which includes a photographic image having a predetermined size using a light source to expose the film to the image includes a first member having a stationary element and a movable element which includes a platform for supporting the photosensitive film in a fixed plane in positional relationship thereto, and a second member for retaining and positioning the photographic image in a fixed position with respect to the platform to expose a portion of the film to the light source to produce an image on the film having generally the same size as the photographic image. The movable element further includes a control arm attached to the platform and a resilient control linkage interconnecting the control arm and the stationary element to allow random movement of the platform in the plane relative to the photographic image. The control arm includes at least one control surface having a defined shape. A mechanism engages the control arm to move the platform and expose a greater portion of the film to the light source. A mechanism for adjustably controlling the movement of the platform to define its path of movement and to selectively determine the degree of movement in the defined path includes an adjustable control member for engaging the control surface. The control member is biased into engagement with the control surface to define the path of movement for the platform, and the control member is adjustable relative to the control surface to establish variable limits of movement of the control surface relative to the control member.

22 Claims, 11 Drawing Figures

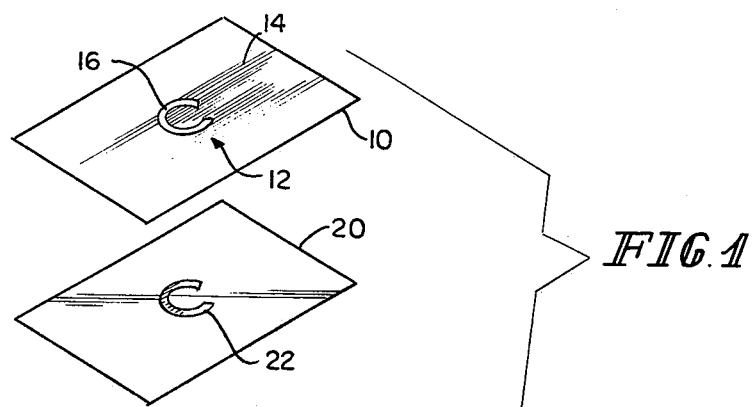
FIG. 1
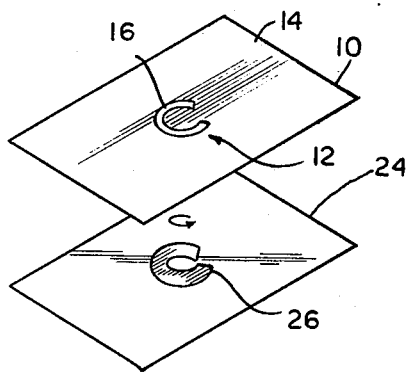
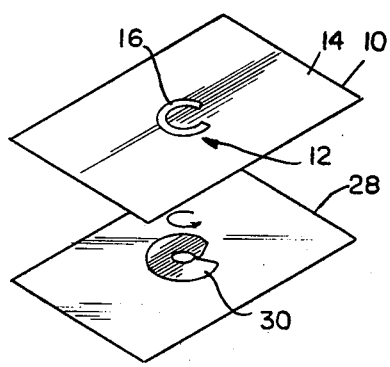
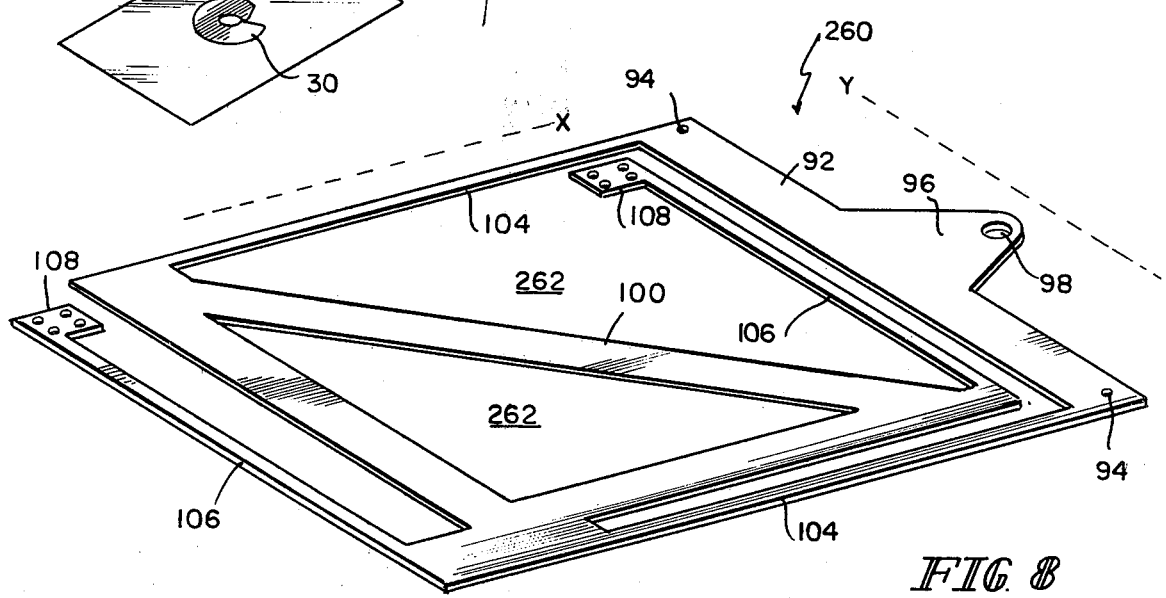
FIG. 8

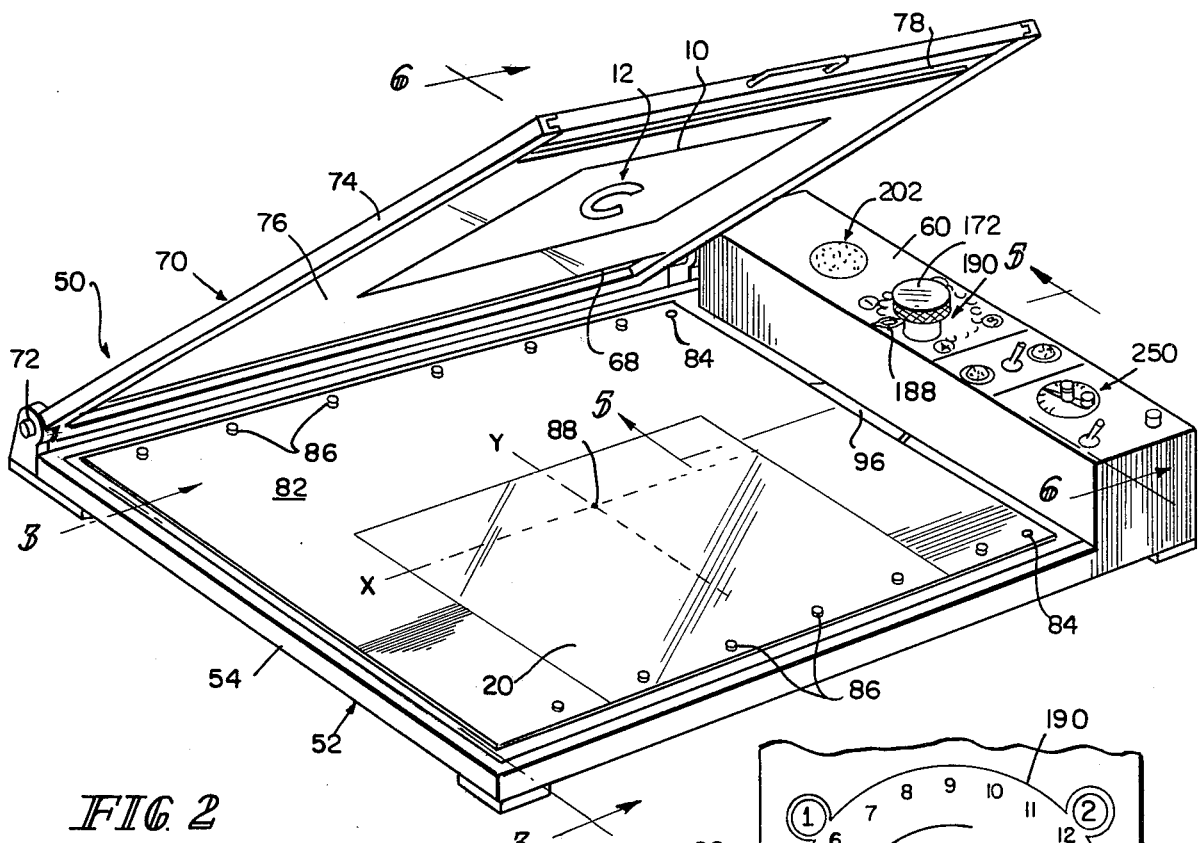
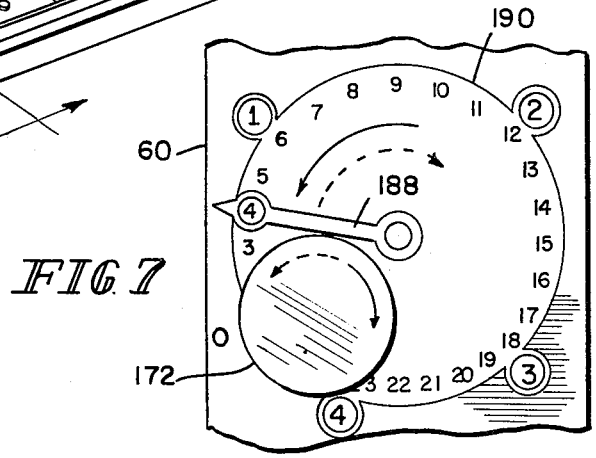
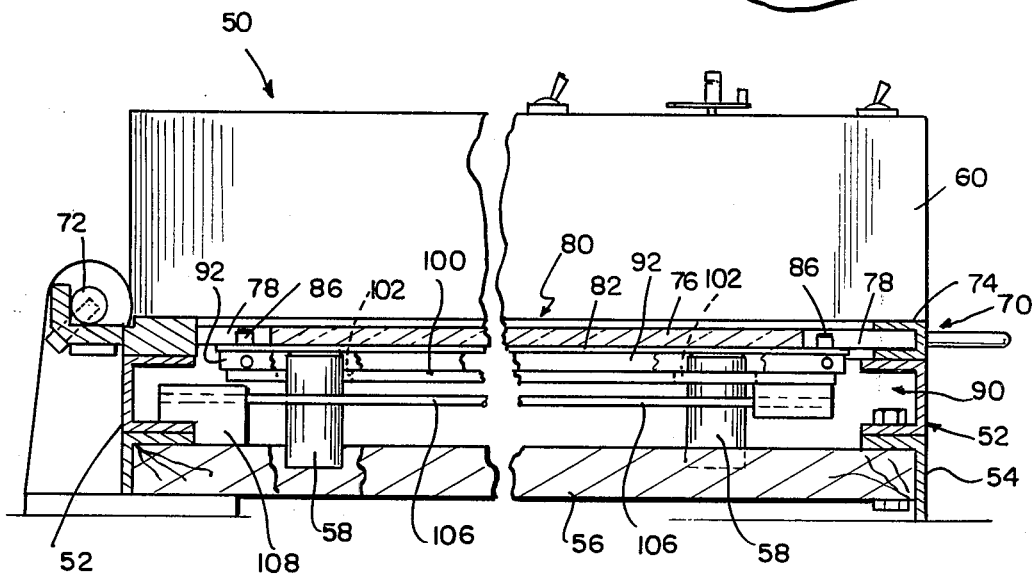

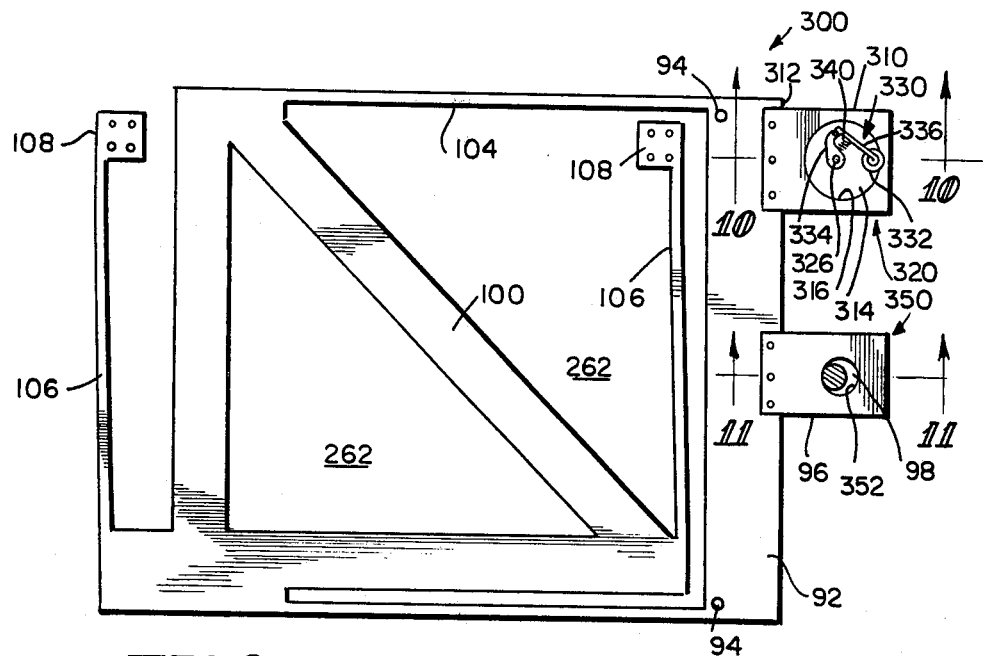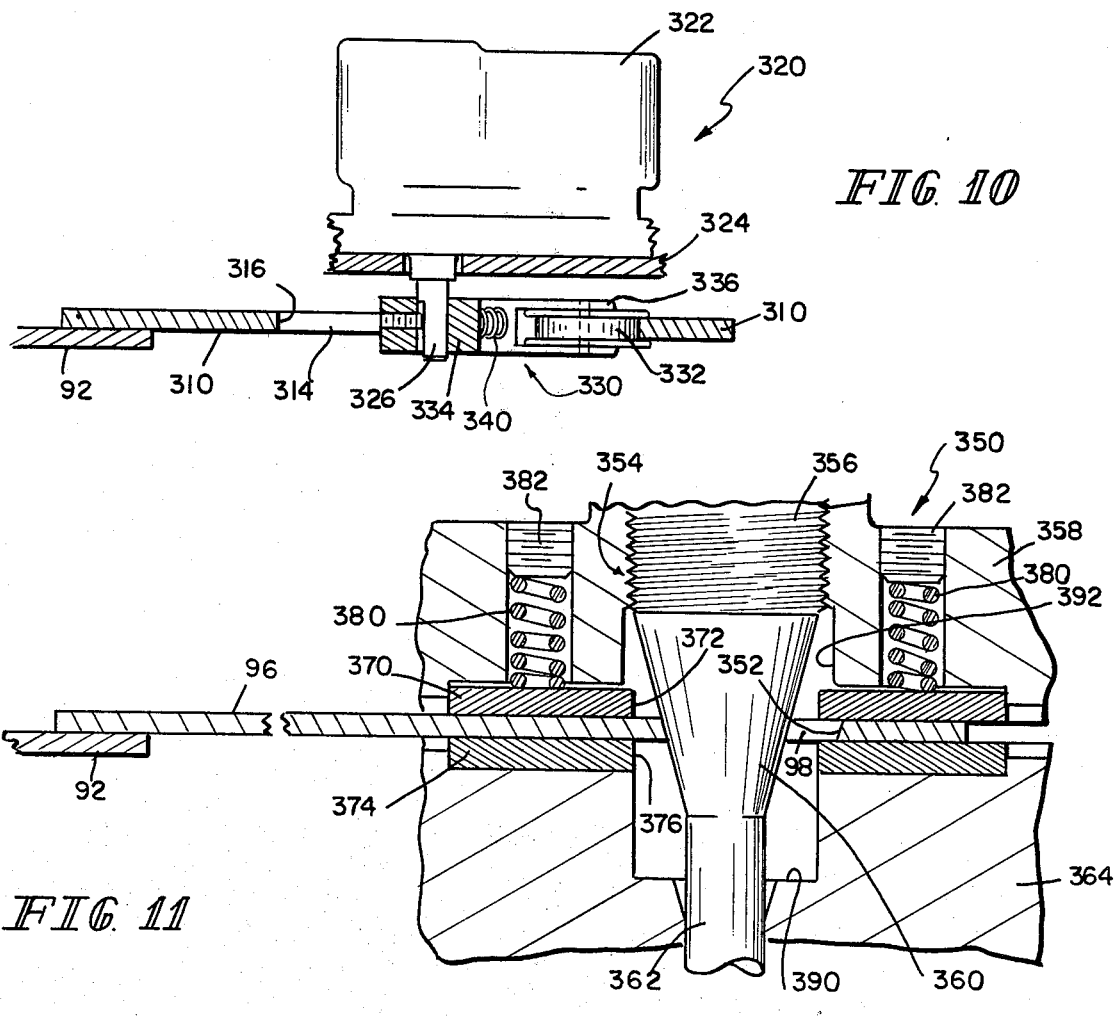

APPARATUS AND METHOD FOR PRODUCING IMAGES OF VARIOUS SIZES ON PHOTOSENSITIVE FILM

The present invention relates to apparatus for producing images of various sizes on photosensitive film. More particularly, the present invention relates to improvements in movably mounting a platform for supporting the photosensitive film in a plane in proximal relationship to a photographic image and in moving and controlling the movement of the platform in a defined path to expose the photosensitive film to a light source to vary the size of the image produced on the photosensitive film.

Various methods and apparatus have previously been employed for producing images of various sizes on photosensitive film from a photographic image having a predetermined size. In general, most of the conventional methods and apparatus produce larger or smaller images on the photosensitive film which are distorted and not proportionately the same as the original photographic images. Some of these conventional apparatus employ mirrors and/or other reflective devices or materials to vary the size of the image produced on the photosensitive film and they fail to provide a sharp definition of the image. Other mechanisms have varied the spatial relationship between the photographic image to be produced and the photosensitive film; however, this method also produces images which are distorted and not proportionately the same as the original photographic image.

Previous apparatus have been developed for producing images of various sizes on photosensitive film from a photographic image where the proximal relationship between the photographic image and the photosensitive film is fixed and where the produced image has a sharp definition and is proportionately the same as the photographic image. These apparatus include a platform for supporting the photosensitive film in a plane in proximal relationship to the photographic image, at least two means for driving the platform, means for coupling the two driving means to the platform, and means for synchronously controlling the coupling means to determine the degree of movement of the platform. Heretofore, two driving means have been required. The two driving means have been synchronously controlled to determine the degree of movement of the platform. According to the present invention, a unique mounting mechanism for the platform allows the platform to be randomly moved by a single moving means, and movement of the platform is directly controlled to determine the degree of movement thereof.

It is therefore one object of the present invention to provide an apparatus for producing images of various sizes on photosensitive film having improved means for mounting the platform which supports the photosensitive film and improved means for moving and controlling the movement of the platform. These improvements reduce the number of elements needed to move and control the platform.

Yet a further object of the present invention is to provide a relatively simple and inexpensive apparatus of the type described above which is easy to operate and is less complex than previous apparatus.

Still a further object of the present invention is to provide an apparatus of the type described above where the platform is moved from a single point relative to two stationary points, and the movement of the platform is directly controlled as opposed to moving the platform from at least two points and controlling the movement of those two points to control the movement of the platform.

According to one illustrative embodiment of the present invention, the apparatus includes a base, a platform movable relative to the base for supporting the photosensitive film in a plane in fixed proximal relationship to the photographic image to expose a portion of the film to the light source to produce an image on the film of generally the same size as the photographic image, a control arm for carrying the platform in fixed relationship thereto, a resilient control linkage interconnecting the control arm and the base to allow random movement of the platform in the plane relative to the photographic image, means for moving the platform to expose a greater portion of the film to the light source to vary the size of the image produced on the film, and means for adjustably controlling the movement of the platform to define its path of movement and to selectively determine the size of the path of movement.

The platform includes at least one point having a home position definable by coordinates of first and second perpendicular axes which is driven to move the platform, and movement of the platform is directly controlled to define a path of movement and adjust the degree of movement to increase the area of exposure of the film to the light source.

Further according to the illustrative embodiment of the present invention, a method of producing images of various sizes on photosensitive film from a photographic image having a predetermined size using a light source to expose the film to the photographic image includes the steps of supporting the photosensitive film on a movable platform in positional relationship thereto and in a plane in fixed spatial relationship to the photographic image to expose a portion of the film to the light source to produce an image on the film having generally the same size as the photographic image, moving the platform in the plane from a single point to expose a greater portion of the film to the light source to vary the size of the image produced on the film, and adjustably controlling the movement of the platform to define a path of movement and to selectively determine the degree of movement of the platform by employing a control member and engaging a portion of the platform structure.

Various other features and advantages of the present invention will become apparent in view of the following detailed description of an illustrative embodiment thereof, which description should be considered in conjunction with the accompanying drawings, in which:

FIG. 1 is a diagrammatic representation showing various size images produced on photosensitive film from a photographic image having a predetermined size employing the apparatus of the present invention;

FIG. 2 is a perspective view of an apparatus according to the present invention for producing images of various sizes on a photosensitive film;

FIG. 3 is a cross-sectional view, partially broken away, of the apparatus of FIG. 2 taken generally along section lines 3—3 of FIG. 2;

FIG. 7 is a fragmentary top plan view of the portion of the apparatus shown in FIG. 6;

FIG. 8 is a perspective view of another embodiment of a portion of the apparatus shown in FIGS. 2 and 3;

FIG. 9 is a top plan view of a further embodiment of the portion of the apparatus shown in FIGS. 4 and 8;

FIG. 10 is a cross-sectional view of the portion of the apparatus shown in FIG. 9 taken generally along section lines 10—10 in FIG. 9; and FIG. 11 is a cross-sectional view of the portion of the apparatus shown in FIG. 10 taken generally along section lines 11—11 in FIG. 9.

Figure 4:
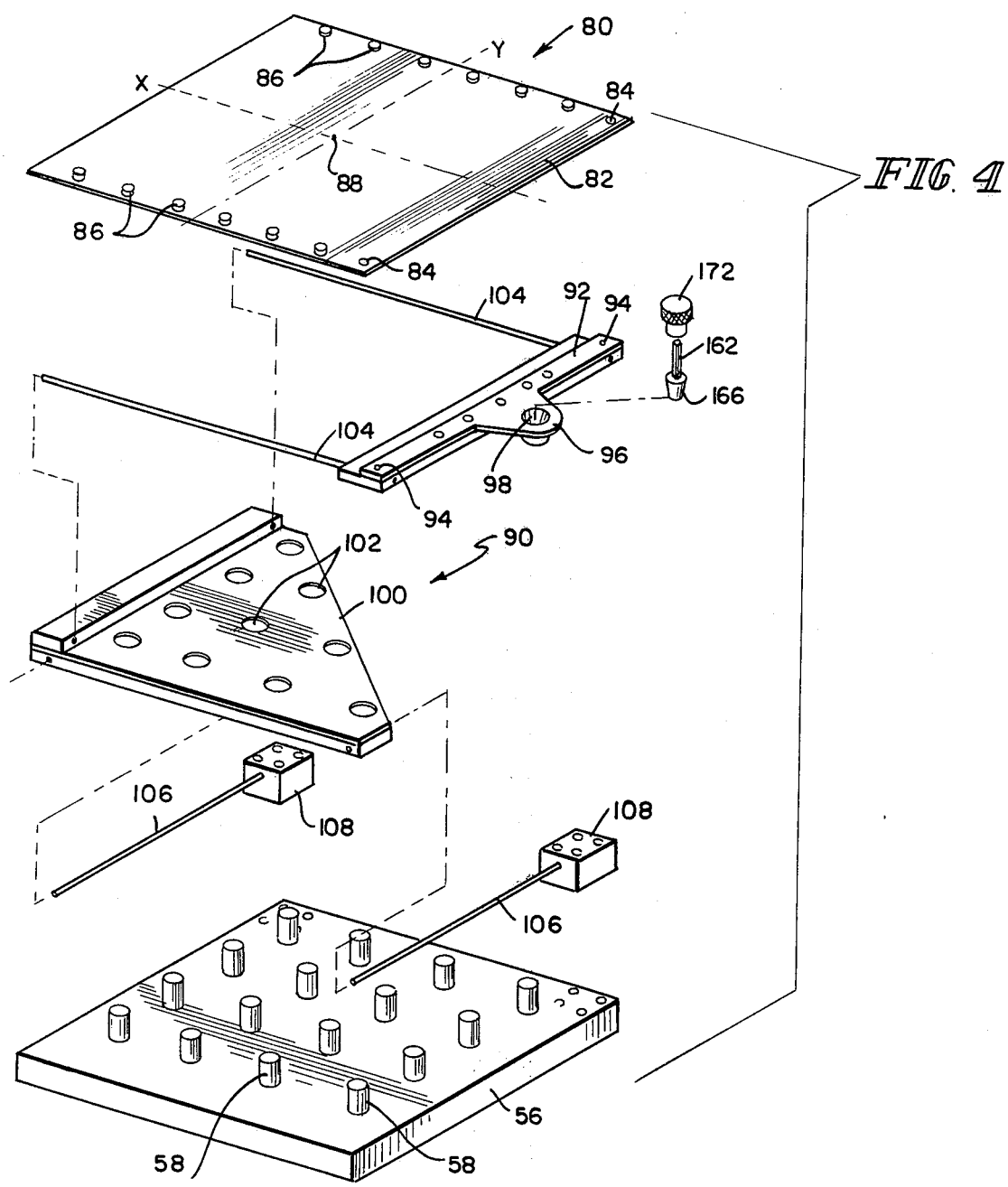
FIG. 4 is an exploded view of a portion of the apparatus shown in FIGS. 2 and 3.

Referring to FIG. 1, the apparatus of the present invention is particularly adaptable for producing images of various sizes on a photosensitive film from either a photographic negative or positive which includes a photographic image having a predetermined size using a light source. The images produced on the film may be either larger ("spreading") or smaller ("shrinking") than the predetermined size of the photographic image. As shown in the series of drawings in FIG. 1, the artwork containing the image for spreading or shrinking is photographed to produce either a photographic negative or positive 10 which includes a photographic image 12 having a predetermined size which is generally the same size as the image on the artwork being photographed. The photographic negative or positive 10 will include a first area 14 which will be either opaque or transparent, respectively, and a second area 16 corresponding to the photographic image 12 which will be either transparent or opaque, respectively.

It will be appreciated that the present invention has many applications in the photographic and printing arts for producing images on photosensitive film which are either larger or smaller than the predetermined size of the photographic image 12. One application in particular is in the process of making a printing plate for fine printing, such as, for example, the process disclosed in U.S. Pat. No. 3,806,575, issued Apr. 23, 1974, and assigned to the same assignee as the present application. In the process disclosed in U.S. Pat. No. 3,806,575, photographic positives with images of various sizes are used in conjunction with light-sensitive emulsion layers to produce recessed areas in the emulsion layers which are then laminated to produce a multi-layered image projection on a printing plate. Conventional means for producing the photographic positives with enlarged images have heretofore been unacceptable because of distortion, disproportion, and the inability to obtain a sharp definition of the image. The apparatus of the present invention solves these problems.

Continuing to refer to FIG. 1 and assuming for illustrative purposes that the artwork image has been produced on a photographic negative 10 so that the first area 14 is opaque and the second area 16 is transparent, the method of operation of the present invention can be generally described as follows. The photographic negative 10 is placed over and in fixed spatial relationship to a first photosensitive film 20. A light source (not shown) is employed to expose the photosensitive film 20 beneath the transparent area 16 corresponding to the photographic image 12 to produce a positive image 22 on the first photosensitive film 20 having generally the same size as the photographic image 12 on the photographic negative 10. The photographic negative 10 is then placed over and in fixed spatial relationship to a second photosensitive film 24 and the light source (not shown) is again used to expose the photosensitive film 24 beneath the photographic image 12. The photosensitive film 24 is displaced a selectively determined amount in a defined path of motion to expose a larger portion of the second photosensitive film 24 to the light source to produce a positive image 26 which is larger in size than the photographic image 12 on the photographic negative 10. The photographic negative 10 is then placed over and in fixed spatial relationship with a third photosensitive film 28 and the light source exposes that portion of the third photosensitive film 28 located beneath the photographic image 12. The third photosensitive film 28 is displaced a selectively determined amount which is greater than the amount of displacement of the second photosensitive film, in the defined path of motion to produce a positive image 30 having a size larger than the image 26 produced on the second photosensitive film 24. These photographic positives 20, 24, 28, which include images of various sizes corresponding to the photographic image 12, can then, illustratively, be used in the process of forming a printing plate disclosed in U.S. Pat. No. 3,806,575.

It should be understood that if a photographic positive 10 were used so that the first area 14 is transparent and the second area 16 corresponding to the photographic image 12 is opaque, then displacement of the photosensitive films 24, 28 results in greater exposure of the photosensitive films 24, 28 to the light source to thereby reduce the size of the images 26, 30 produced on the photosensitive films 24, 28, respectively.

Referring now to FIGS. 2 and 3, one illustrative embodiment of an apparatus 50 according to the present invention is shown for producing the images 26, 30 on the photosensitive films 24, 28 from a photographic image 12 of artwork having a predetermined size where the images 26, 30 are not distorted, not disproportionate to the photographic image 12, and are sharply defined. The apparatus 50 includes a generally rectangular base 52 which has a stationary frame section 54 forming a border on the periphery of the base 52. As best shown in FIG. 3, the frame section 54 has a lower stationary platform 56 mounted to the frame 54 near the bottom of the base 52. The lower platform 56 is illustratively constructed of wood and includes a plurality of equally spaced vertically extending posts 58 which are cylindrical and project upwardly from the lower platform 56 to a level generally equivalent to the top of the frame section 54. These posts 58 are fabricated of a flexible material, such as rubber, to allow slight bending or movement thereof relative to the lower platform 56. The base 52 also includes a control console section 60 located adjacent to one side of the frame section 54 for housing various mechanisms for controlling the operation of the apparatus 50.

Hingably mounted to the base 52 is a generally rectangular cover 70 which is pivotable about points 72 so that the cover 70 may be lifted and lowered relative to the frame section 54 of the base 52. The cover 70 also includes a generally rectangular frame section 74 which generally corresponds in size to the frame section 54 of the base 52. The frame section 74 of the cover 70 includes means for mounting a transparent plate or panel, such as glass, within the cover 70. For reasons which will become apparent later, the transparent panel 76 has one dimension, such as width, which is less than the corresponding dimension (width) of the frame section 74 so that spaces 78 are provided between the transparent panel 76 and the frame section 74 adjacent opposite sides of the transparent panel 76. The transparent panel 76 provides a support surface for either a photographic negative or positive 10 which includes a photographic image 12 having a predetermined size which is generally the same size as the photographed artwork image. Conventional means such as adhesives may be employed to maintain the photographic negative or positive 10 in a fixed position on the transparent panel 76.

The base 52 further includes a movable table section 80 mounted within the stationary frame section 54 for supporting a sheet of photosensitive film 20 in fixed spatial relationship to the photographic negative or positive 10 when the cover 70 is lowered onto the base 52. Referring more particularly to FIG. 4, the table section 80 includes a generally rectangular upper platform 82 which is darkened to provide a photographic background to support the sheet of photosensitive film 20. The upper platform 82 is provided in a fixed horizontal plane and includes apertures 84 provided in proximity to one edge of the platform 82 and a plurality of upwardly projecting rigid locating pins 86 along other opposed edges of the platform 82. The locating pins 86 are provided for fixing the photosensitive film 20 in positional relationship to the platform 82 and are located along edges of the platform 82 which correspond to the spaces 78 provided between the frame section 74 and the transparent panel 76 of the cover 70 so that when the cover 70 is lowered onto the base 52, the locating pins 86 project into the spaces 78 to provide a close relationship between the photographic negative or positive 10 and the sheet of photosensitive film 20. The upper platform 82 also has associated with its position within the frame section 54 of the base 52 imaginary X-Y axes which, for illustrative purposes, intersect at the center 88 of the platform 82.

Continuing to refer to FIG. 4, means 90 is provided for mounting the upper platform 82 within the frame section 54 of the base 52 which allows horizontal displacement of the center 88 of the platform 82 in oscillatory paths which may be represented by coordinates of the X-Y axes. For example, the center 88 may be displaced along the path of the circumference of an imaginary circle having a predetermined radius represented by coordinates of the X-Y axes. The mounting means 90 includes an elongated generally rectangular control arm 92 having apertures 94 which are spaced apart to correspond to apertures 84 for securing the upper platform 82 to the control arm 92 in fixed relationship thereto. The control arm 92 includes a tongue 96 which projects horizontally from the center of the arm 92 and the tongue 96 includes a cylindrical-shaped cup 98 which extends downwardly from the tongue 96 to provide an upwardly opening cylindrical cavity. The mounting means 90 further includes a generally triangular-shaped control plate 100 having a plurality of equally spaced circular apertures 102 which are generally spaced to correspond to the spaced relationship of the posts 58 extending upwardly from the stationary lower platform 56 of the base 52. It should be noted that the apertures 102 formed in the control plate 100 have a diameter which is greater than the posts 58 so that when the posts 58 project upwardly through the apertures 102, the control plate 100 is movable relative to the posts 58 and the stationary lower platform 56.

A first pair of control linkages connects the control arm 92 to the control plate 100 and extends in parallel relationship to the X axis of the upper platform 82. The control linkages 104 are flexible torsion springs which allow movement of the control arm 92 and the upper platform 82 to move the center 88 in the direction of the Y axis of the platform 82 relative to the stationary platform 56. A second pair of control linkages 106 connects the control plate 100 to the stationary lower platform 56 of the base 52 and is connected to the stationary lower platform 56 by mounting blocks 108. The second pair of control linkages 106 extends generally parallel to the Y axis of the upper platform 82 and allows movement of the control plate 100, control arm 92, and upper platform 82 to move the center 88 in the direction of the X axis of the upper platform 82 relative to the stationary lower platform 56. It should be noted that the control plate 100 only moves in the direction of the X axis. There is no movement of the control plate 100 in the direction of the Y axis. Yet the control plate 100 serves as a link between the linkages 104, 106 to allow the control arm 92 to be moved in a plurality of directions relative to both the X-Y axes to allow random movement of the platform 82. From the above description, it can be appreciated that the mounting means 90, while permitting random movement of the upper platform 82 relative to the stationary lower platform 56, also provides some control of such movement of the upper platform 82.

Figure 6:
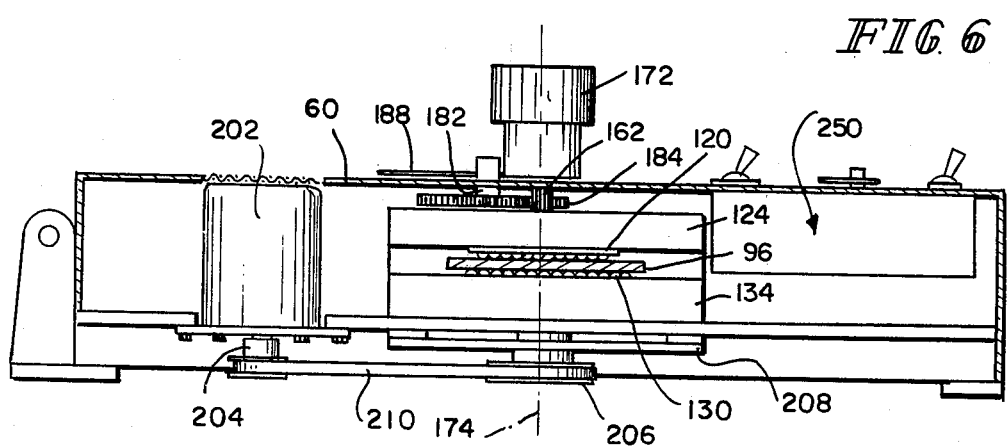
FIG. 6 is a vertical section view of another portion of the apparatus shown in FIGS. 2 and 3 taken generally along section lines 6—6 of FIG. 2.
Figure 5:
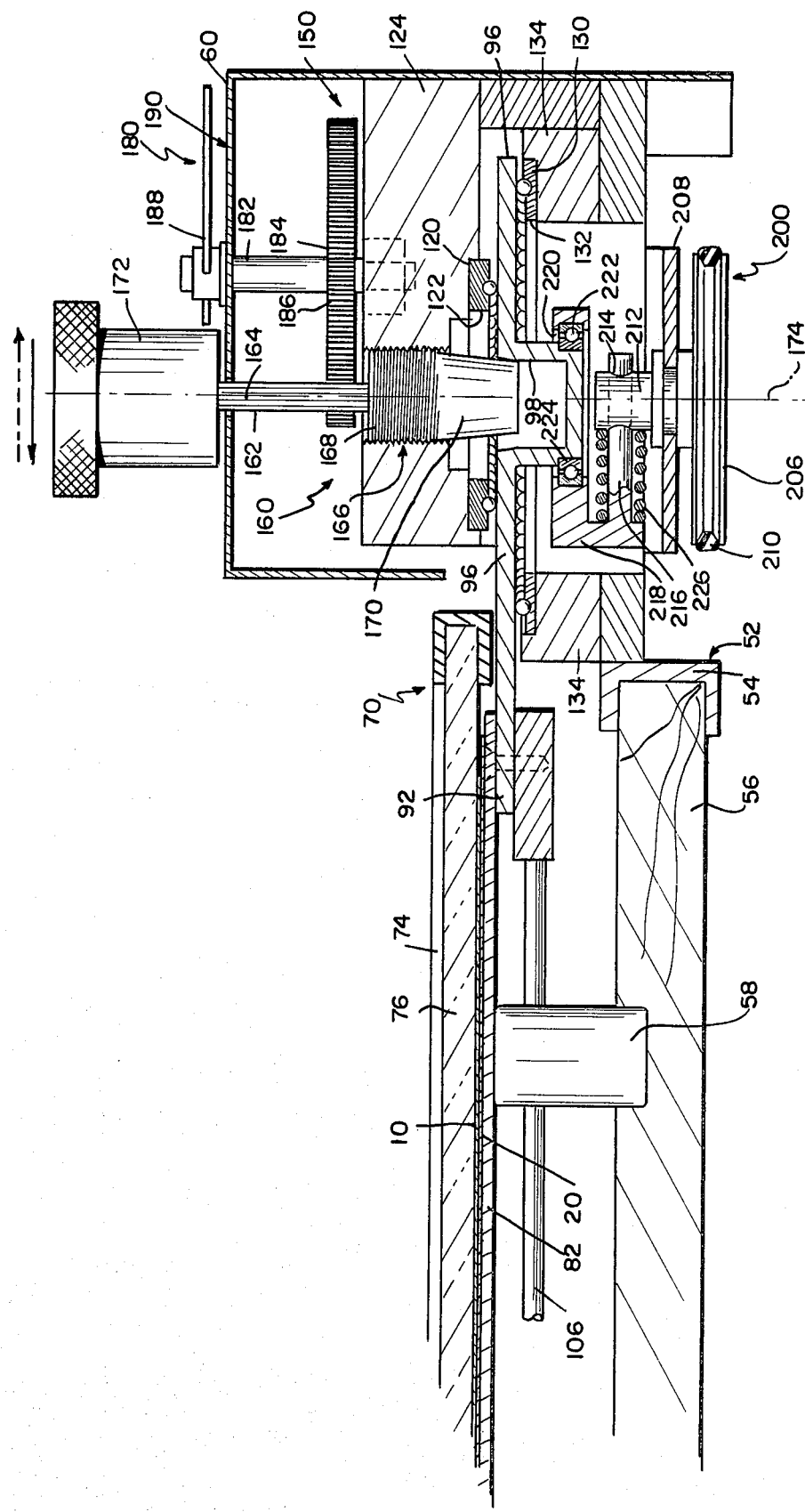
FIG. 5 is an enlarged vertical section view of a portion of the apparatus shown in FIGS. 2 and 3 taken generally along section lines 5—5 of FIG. 2.

Referring now to FIGS. 5 and 6, the tongue 96 of the control arm 92 is positioned within the control housing section 60 of the base 52 and contained therein between an upper circular ring of bearings 120 formed concentrically about a central opening 122 and mounted within the housing 60 to an upper mounting structure 124 and a lower circular ring of bearings 130 also formed concentrically about a central opening 132 and mounted within the housing 60 to a lower mounting structure 134. Included within the housing 60 is a system 150 which engages the tongue 96 of the control arm 92 to define the path of and determine the degree of the movement of the upper platform 82. By controlling the movement of the control arm 92 using the tongue 96, the center 88 of the upper platform 82 is displaced a selectable distance in a defined path relative to the X-Y axes, which may be represented by X-Y coordinates. For example, the center 88 may follow a first circular path having a first radius on the X-Y axes determined by the system 150, and the system 150 may thereafter be adjusted so that the center 88 of the platform 82 follows a second circular path having a second radius on the X-Y axes. Accordingly, while the photographic negative or positive 10 remains stationary and fixed to the transparent panel 76 of the cover 70 and the sheet of photosensitive film 20 is fixed in spatial relationship to the photographic negative or positive 10, the film 20 may be controllably displaced or oscillated in a horizontal plane relative to the photographic negative or positive 10 to expose greater portions of the film 20 to the light source to produce an enlarged or reduced image on the sheet of photosensitive film 20.

Continuing to refer to FIGS. 5 and 6, the control system 150 includes a mechanism 160 for defining the path of and adjustably determining the degree or amount of displacement of the center 88 of the platform 82 relative to the X-Y axes. In the illustrative embodiment, the mechanism 160 allows the user to selectively determine the radius of the circular path of movement of the center 88 of the platform 82 relative to the X-Y axes. The mechanism 160 includes an elongated shaft 162 extending vertically into the housing 60 having a plurality of teeth 164. Connected to one end of the shaft 162 is a frustoconical-shaped member 166 which includes a threaded portion 168 for engaging the upper mounting structure 124 within the housing 60 and a tapered portion 190 which projects axially into the upwardly opening cavity of the cup 98 in the tongue 96. Connected to the other end of the shaft 162, outside the housing 60, is an adjustment knob 172 which in response to the rotation thereof axially moves the tapered portion 170 of the member 166 into and out of the upwardly opening cavity of the cup 98. The axis 174 of the shaft 162 corresponds in location to the centers of the openings 122, 132 of the upper and lower circular rings of bearings 120, 130, respectively.

The system 150 further includes a calibrated indicator 180 for indicating the degree of movement of the platform 82 selected by the user. As best illustrated in FIG. 5, the indicator 180 includes a vertically extending shaft 182 rotatably mounted at one end to the upper mounting structure 124 in the housing 60 with the other end projecting outside the housing 60. Secured to the shaft 182 is a circular gear 184 whih includes a plurality of teeth 186 which engage the teeth 164 on the shaft 162. As can best be seen in FIG. 7, the end of the shaft 182 which projects out of the housing 60 has a pointer 188 secured thereto. Provided on the surface of the housing 60 adjacent the pointer 188 is a circle of numbers. The numbers represent the degree of movement or displacement of the upper platform 82 which has been selected in response to adjustment of the mechanism 160.

As viewed in FIG. 5 and 7, rotation of the shaft 162 in the clockwise direction, indicated by the solid arrow in these figures, causes the conical-shaped member 166 to be axially displaced downwardly further into the cavity of the cup 98 to decrease the degree of movement of the tongue 96 and therefore the platform 82. This clockwise rotation of the shaft 162 causes a corresponding counterclockwise movement of the pointer 188 so that the pointer progressively indicates a lower number. Likewise, rotation of the shaft 162 in the counterclockwise direction, as indicated by the broken arrow in these figures, axially moves the conical-shaped member 166 upwardly out of the cavity of the cup 98 to increase the degree of movement of the tongue 96 and therefore the platform 82. This counterclockwise rotation of the shaft 162 causes a corresponding clockwise rotation of the pointer 188 so that the pointer 188 progressively points to higher numbers indicating a greater amount of displacement of the platform 82. Larger numerals, such as 1, 2, 3, and 4, may be positioned around the circle of numbers to indicate preferred degrees of movement or horizontal displacement of the platform 82 for particular types of applications.

Located below the tongue 96 in the housing 60 is a mechanism 200 for moving the tongue 96 from a single point to cause corresponding movement or horizontal displacement of the platform 82. The mechanism 200 includes a motor 202, as best shown in FIG. 6, mounted within the housing 60 and having a pulley 204 rotatably mounted thereto. Also rotatably mounted within the housing directly below the cup 98 of the tongue 96 is a second pulley 206. A mounting bracket 208 supports the pulley 206 for rotation and the pulley 206 is driven by a belt 210 in response to the motor 202. Connected to the pulley is a cylindrical shaft 212 which is concentric to the axis 174 of the shaft 162 of the mechanism 160 and which extends axially upward toward the bottom of the cup 98 of the tongue 96. The shaft 212 includes an aperture 214 which extends radially therethrough and intersects the axis 174. The aperture 214 slidably receives an elongated post 216 which forms a part of a lever 218 for controlling the movement of the tongue 96 and the platform 82. The lever 218 includes a circular opening 220 which encompasses and is concentric to the cup 98 of the tongue 96. The circular opening 220 includes a plurality of bearings 222 which engage a bearing surface 224 provided on the outer periphery of the cup 98. Accordingly, in response to rotation of the shaft 212 by the motor 202, the control lever 218 is rotatable about the axis 174. Retained between the control lever 218 and the shaft 212 is a compression spring 226 which continuously biases the control lever 218 away from the shaft 212. In response to this bias, when the shaft 212 and control lever 218 are rotated, the interior surface of the cup 98 is continuously forced against the conical-shaped member 166 of mechanism 160. This action causes the tongue 96 to be moved in a circular motion where the radius of the circle is determined by the extent to which the conical-shaped member 166 is advanced into the cavity of the cup 98. Since the tongue 96 is in turn connected to the platform 82 through the control arm 92, this coaction between the control lever 218 and the conical-shaped member 166 defines a path of movement for the center 88 of the platform 82 relative to the X-Y axes.

Also housed within the control console 60 is a system 250 for controlling the activation and deactivation of the apparatus 50 and the light source (not shown) which is positioned above the apparatus 50 to expose the photosensitive film 20 to the photographic image 12. This control system 250 includes conventional switches for activating and deactivating the motor 202 and light source, and also may include a timing mechanism for controlling the length of time the sheet of photosensitive film 20 is exposed to the light source through the photographic negative or positive 10.

Shown in FIG. 8 is another embodiment of a mounting mechanism 260 which corresponds to the mechanism 90 previously described, except that the mechanism 260 is constructed as a single unit. In FIG. 8, corresponding reference numerals have been used to identify corresponding elements of the mechanism 90 which are now included in a unitary structure 260. For example, the mechanism 260 includes a control arm 92 having apertures 94 which are spaced apart to correspond to the apertures 84 of the upper platform 82, a horizontally extending tongue 96 which includes a cylindrical-shaped cup 98 and a control plate 100. As shown in FIG. 8, control plate 100 has been changed from a triangular shape to an elongated rectangular strip having a width small enough to fit angularly between the posts 58 projecting upwardly from the lower platform 56. Posts 58 therefore project upward through openings 262 provided in the mechanisms 260. Formed integrally with the control arm 92 and control plate 100 are a first pair of control linkages 104 and a second pair of control linkages 106. The control linkages 106 include a pair of mounting blocks 108 for securing the mechanism 260 to the stationary lower platform 56 of the base 52. The integrated structure of mechanism 260 simplifies the assembly and reduces the overall cost of apparatus 50.

Having described an illustative embodiment of the apparatus 50 of the present invention, its operation can best be described by referring to all of the figures in combination. With the cover 70 lifted, a photographic negative or positive 10 is secured to the transparent panel 76 so that a light source positioned above the apparatus 50 will pass through the transparent areas of the photographic negative or positive 10 onto a sheet of photosensitive film 20 positioned in fixed relationship on the movable upper platform 82 of the table section 80 of the apparatus 50 to produce an image on the photosensitive film corresponding in shape to the photographic image 12. With the cover 70 lowered into position onto the base 52, the posts 58 upwardly extending from the stationary lower platform 56 of the base 52 serve to maintain the upper platform 82 in a fixed close spatial relationship to the photographic negative or positive 10. Initially, the pointer 88 will point to zero on the circle of numerals provided on the control console 60 indicating that the conical-shaped member 166 is fully displaced axially into the cup 98 to prevent movement of the tongue 96 and therefore the upper platform 82. The apparatus is then activated and the knob 172 is rotated in a counterclockwise direction, as indicated by the broken arrows in FIGS. 5 and 7, to axially move the conical member 166 out of the cup 98. In response to the freedom of movement that is permitted by the withdrawal of conical-shaped member 166 from the cup 98, the control lever 218 moves the table section 80, and the path and degree of movement thereof are defined and determined by the coaction between the cup 98 and the conical-shaped member 166 to oscillate the movable table section 80 in circular motions that have increasing diameters with respect to the X-Y axes as the conical-shaped member 166 is withdrawn from the cup 98.

In response to rotation of the knob 172 in the counterclockwise direction, the pointer 188 moves in a clockwise direction, as indicated by the broken arrow in FIG. 7, to progressively point to increasing numbers indicating an increase in the degree of movement associated with the tongue 96 and therefore the upper platform 82. As the conical-shaped member 166 is withdrawn from the cup 98, so that the amount of periodic displacement of the upper panel 82 increases, a greater portion of the photosensitive film 20 is exposed to the light source. If a photographic negative 10 is used so that the photographic image 12 is transparent, then the positive image produced on the photosensitive film 20 becomes larger than the size of the photographic image 12 as the degree of horizontal displacement of the upper platform 82 is selectively increased. In the alternative, if a photographic positive 10 is used so that the photographic image 12 is opaque, then the negative image produced on the photosensitive film 20 becomes smaller than the size of the photographic image 12 as the degree of horizontal displacement of the upper platform 82 is selectively increased.

According to the present invention, a plurality of sheets of photosensitive film 20, 24, 28 may be positioned on the movable table section 80 of the apparatus 50, one at a time, and the degree of displacement of the upper platform 82 can be selected to produce images from a photographic negative 10 which are in each case larger than and in exact proportion to the photographic image 12 without distortion.

Shown in operating positions in FIGS. 9-11 are further embodiments of a mounting mechanism, a mechanism for determining the degree or amount of displacement of the center 88 of the platform 82 relative to the X-Y axes and a mechanism for moving the mounting mechanism to horizontally displace the platform 82 in a defined path. In general, the changes made in the embodiments shown in FIGS. 9-11 relate to the separation of the mechanism for determining the degree of displacement and the mechanism for moving the platform 82.

Referring particularly to FIG. 9, a mounting mechanism 300 generally corresponds to the mechanism 260 shown and described in FIG. 8 with the addition of a drive tongue 310 separate from a control tongue 96. In FIG. 9, corresponding reference numerals have been used to identify corresponding elements of the mechanism 260, and no further explanation of these elements is provided, except in relation to the changes made in the mechanism 300. In lieu of a cylindrical-shaped cup for cavity 98, the control tongue 96 includes a circular opening for cavity 98. The additional drive tongue 310 is mounted or formed integrally with the control arm 92 at one end 312 of the control arm 92. The tongue 310 includes a cavity 314 which in general is a circular opening having a diameter which is greater than the diameter of cavity 98. The cavity 314 includes an inner control surface 316, and the location of tongue 310 corresponds generally to the location of the motor 202 in FIG. 2.

Turning to FIGS. 9 and 10, mechanism 320 for moving the mounting mechanism 300 to horizontally displace the platform 82 includes a conventional motor 322 mounted by a support bracket 324 above the tongue 310. The motor 322 includes a drive shaft 326 which projects axially downward into the cavity 314, and when the center 88 of the platform 82 is in its home position, the cavity 314 is concentric with the shaft 326. Mounted to the shaft 326 and rotatable therewith is a control lever 330 which includes a circular rotatable wheel 332 for engaging the inner control surface 316 of the cavity 314. The control lever 330 further includes a first member 334 secured to the shaft 326 and extending radially outward therefrom and a second element 336 pivotally mounted to the distal end of the first element 334 for supporting the circular wheel. The second element 336 is continuously biased away from the shaft 326 into engagement with the inner control surface 316 of the cavity 314 by a relatively stiff compression spring 340. Accordingly, as the motor rotates in, for example, a counterclockwise direction, as viewed in FIG. 9, the wheel 332 is continuously forced against the control surface 316 to cause corresponding dis-placement of the platform 82. The path and degree of displacement are adjustably determined by a control mechanism 350.

Referring to FIGS. 9 and 11, a mechanism 350 for defining the path and determining the degree or amount of displacement of the center 88 of the platform 82 relative to the X-Y axes utilizes the control tongue 96 and cavity 98 and, unlike the embodiment shown in FIGS. 5 and 6, the mechanism 350 is separated from the moving mechanism 320, although many elements of the mechanism 350 are similar in construction and function to the mechanism 160 described previously, it should be noted that cavity 98 has been provided with an inclined inner control surface 352.

The mechanism 350 allows the user to selectively determine the radius of the circular path of movement of the center 88 of the platform 82 relative to the X-Y axes and includes a conical-shaped member 354 which is connected to one end of the shaft 162 shown in FIG. 5. The conical-shaped member 354 includes a threaded portion 356 for engaging an upper mounting structure 358, a tapered portion 360 which projects axially downward into the cavity 98 in control tongue 96, and a cylindrical portion 362 which extends further axially downward and is rotatably retained in a lower mounting structure 364 to stabilize the member 354. Cylindrical portion 362 is also axially movable in support structure 364 to allow axial movement of the tapered portion 360 relative to the cavity 98.

The control tongue 96 is retained between the upper and lower support structures 358, 364 by an upper circular bearing ring 370 having a central opening 372 concentric to the axis of the member 354 and a lower circular bearing ring 374 having a central opening 376 also concentric to the axis of the member 354. In the illustrative embodiment, shown in FIGS. 9 and 11, the bearings are oil impregnated and the upper circular bearing ring 370 is biased downward against the upper surface of control tongue 96 by two compression springs 380 mounted within the upper support structure 358 and retained therein by adjustable screws 382 for adjusting the force applied by the bearings 370, 374 to the control tongue 96. it should also be noted that support structures 358, 364 each include cavities 390, 392, respectively, which provide room for axial movement of the tapered portion 360 relative to the cavity 98 in the tongue 96.

Operation of the mechanism 350 is generally the same as previously described relative to mechanism 160. Briefly, movement of the member 354 axially downward relative to the cavity 98 in tongue 96 decreases the degree of movement of the platform 82, whereas movement of the member 354 axially upward relative to the cavity in tongue 96 increases the degree of movement of the platform 82.

For purposes of the above description, the term "photosensitive film" is defined as including any light-sensitive layer of material which, when exposed to a light source and photographic image, produces the image on the layer and is not intended to be limited to any particular film or material. Further, as used herein, the processes of producing enlarged and reduced images on a light-sensitive layer are commonly referred to in the trade as "spreading" and "shrinking," respectively.

What is claimed is:

1. An apparatus for producing images of various sizes on photosensitive film, comprising a base, a platform movable relative to the base for supporting one of a photosensitive film and a photographic image in a plane in fixed proximal relationship to the other of the photosensitive film and photographic image to expose a portion of the film to a light source to produce an image on the film of generally the same size as the photographic image, a control arm for carrying the platform in fixed relationship thereto, a resilient control linkage interconnecting the control arm and the base to allow random movement of the control arm and platform, moving means for randomly moving the control arm to randomly move the platform to expose a greater portion of the film to the light source to vary the size of the image produced on the film, and adjustable control means for limiting the random movement of the platform to define its path of movement and to selectively determine its degree of movement.

2. The apparatus as recited in claim 1 wherein the resilient control linkage includes a rigid control plate and at least two flexible linkages, one linkage coupling the control arm to the control plate and the other linkage coupling the control plate to the base, the control arm being movable relative to the control plate in a first direction, and the control plate and control arm being movable relative to the base in a second direction generally perpendicular to the first direction to allow random movement of the control arm.

3. The apparatus as recited in claim 2 wherein the control arm includes at least one cavity having an inner surface of a defined shape, and the adjustable control means for controlling the movement of the platform includes a tapered member for engaging the inner surface of the cavity and adjustment means for axially moving the tapered member relative to the cavity to selectively determine the degree of movement of the control arm relative to the tapered member.

4. The apparatus as recited in claim 3 wherein the control arm includes a second cavity separate from the one cavity also having an inner surface, and the means for moving the platform includes a control lever for engaging the inner surface of the second cavity, propelling means coupled to the control lever for moving the control lever on the inner surface of the second cavity, and means for biasing the control lever away from the propelling means into engagement with the inner surface of the second cavity to force the defined inner surface of the one cavity to continuously engage the tapered member in response to movement of the control lever on the inner surface of the second cavity to move the platform in a defined path determined by the coaction between the first cavity and the tapered member.

5. The apparatus as recited in claim 4 wherein the defined shape of the first cavity is circular to define a circular path of movement for the platform.

6. The apparatus as recited in claim 5 wherein the control arm includes first and second protruding tongues, the first cavity being formed in the first tongue and the first tongue being movably retained between a pair of bearing surfaces to allow horizontal movement of the tongue, and the second cavity being formed in the second tongue.

7. The apparatus as recited in claim 3 wherein the means for moving the platform includes a control lever for engaging an outer surface of the cavity, propelling means coupled to the control lever for moving the control lever on the outer surface of the cavity, and means for biasing the control lever away from the propelling means into engagement with the outer surface of the cavity to force the defined inner surface of the cavity to continuously engage the tapered member in response to movement of the control lever to move the platform in a defined path determined by the coaction between the defined inner surface of the cavity and the tapered member.

8. The apparatus as recited in claim 7 wherein the defined shape of the cavity is cylindrical and the tapered member has a frustoconical shape.

9. The apparatus as recited in claim 8 wherein the propelling means is axially aligned with the axis of the tapered member and the inner surface of the cylindrical cavity is forced to continuously engage the tapered member so that the cavity is eccentric to the axis of the tapered member to define a circular path of movement for the platform.

10. The apparatus as recited in claim 9 wherein the control arm includes a protruding tongue and the cavity is formed in the tongue, the tongue being movably retained between a pair of bearings to allow horizontal movement of the tongue.

11. The apparatus as recited in claim 1 wherein the control arm includes at least one control surface having a defined shape, the moving means engaging the control arm to move the control surface, and the means for controlling the movement of the platform includes a control member for engaging the control surface and means for adjusting the position of the control member relative to the control surface to define a path of movement and to selectively vary the degree of movement of the control arm.

12. The apparatus as recited in claim 11 wherein the control arm includes a second control surface, and the means for moving the platform in the defined path includes a second control member for engaging the second control surface, propelling means coupled to the second control member for moving the second control member on the second control surface to move the platform, and means for biasing the second control member into engagement with the second control surface to cause the first control surface to continuously engage the first control member, the platform being moved in a defined path determined by the coaction between the first control member and first control surface.

13. The apparatus as recited in claim 12 wherein the control arm includes first and second protruding tongues, each of the tongues including a circular opening having an inner control surface, the first control member including a tapered portion and means for axially moving the tapered portion relative to the opening of the first tongue to vary the degree of movement of the control arm, the second control member including a control lever for continuously engaging the inner control surface of the opening of the second tongue to cause the inner surface of the opening in the first tongue to continuously engage the tapered portion of the first control member.

14. A method of producing images of various sizes on photosensitive film from either a photographic negative or positive which includes a photographic image having a predetermined size using a light source to expose the film to the photographic image, comprising the steps of supporting one of the photographic image and photosensitive film on a movable platform in positional relationship thereto and in a plane in fixed proximal relationship to the other of the photographic image and photosensitive film to expose a portion of the film to the light source to produce an image on the film having generally the same size as the photographic image, moving a control arm including a control surface having a defined shape to move at least one point on the platform in the plane to expose a greater portion of the film to the light source to vary the size of the image produced on the film, engaging a control member on the control surface to define a path of movement for the point on the platform in accordance with the defined shape of the control surface, and adjusting the position of the control member relative to the control surface to vary the degree of movement of the platform in the defined path to selectively determine the size of the image produced on the film.

15. The method as recited in claim 14, further comprising the step of continuously biasing the control surface into engagement with the control member.

16. The method as recited in claim 15, further comprising the step of defining the degree of movement of the platform by representing the path of movement of the point in coordinates of perpendicular axes, providing a coded relationship between the coordinates of the perpendicular axes and degrees of movement of the platform, and selecting a coded relationship to establish a position of the control member relative to the control arm.

17. An apparatus for producing images of various sizes on photosensitive film, comprising a movable platform for supporting the photosensitive film in a plane in fixed proximal relationship to a photographic image; at least one point on the platform having its position definable by coordinates of first and second perpendicular axes; means for driving the platform to move the point in the plane to increase the area of the film exposed to the light source; and control means for defining a path of movement and for selectively determining the degree of movement for the point relative to the axes to vary the size of the image produced on the film; the control means including a movable control arm for carrying the platform in fixed relationship thereto, the control arm including a first control surface having a defined shape and a second control surface, a first control member for engaging the first control surface to define the path of movement, and means for adjusting the position of the control member relative to the first control surface to determine the degree of movement of the control arm; the moving means including a second control member for engaging the second control surface, propelling means coupled to the second control member for moving the second control member on the second control surface to move the control arm, and means for biasing the second control member into engagement with the second control surface to cause the first control surface to continuously engage the first control member.

18. Apparatus for producing images of various sizes on photosensitive film, comprising a base, means for positioning and retaining the photographic image in a fixed position with respect to said base, a table movable relative to the base for supporting the photosensitive film in a plane closely adjacent to said image-positioning means, a control arm and resilient control linkage interconnecting the control arm and the base for movably mounting the table to the base, the control arm including at least one control surface, and the control surface having a circular shape, means for moving the control arm to move the table to produce, upon exposure to light, an image on the film having a size different than that of the photographic image, means for controlling the movement of the control arm to define a path of movement and to selectively determine the degree of movement for the table, the control means including an adjustable control member for engaging the control surface, and means for biasing the control surface into engagement with the control member to define a circular path of movement for the control arm.

19. An apparatus for producing images of various sizes on photosensitive film, comprising a base, a platform movable relative to the base for supporting one of a photosensitive film and a photographic image in a plane in fixed proximal relationship to the other of the photosensitive film and photographic image to expose a portion of the film to a light source to produce an image on the film of generally the same size as the photographic image, means for mounting the platform to the base to allow movement of the platform in the plane, the mounting means including a control arm carrying the platform in fixed relationship thereto, a control plate, at least two flexible linkages, one linkage coupling the control arm to the control plate to allow movement of the control arm in a first direction with respect to the control plate, the other linkage coupling the control plate to the base to allow movement of the control plate and control arm in a second direction generally perpendicular to the first direction, means for driving the control arm from a single point to randomly move the platform to expose a greater portion of the film to the light source to vary the size of the image produced on the film, and means for adjustably limiting the movement of the mounting means to define a path of movement and to selectively determine the degree of movement of the platform, the control means including an adjustable control member for engaging the control arm to establish limits of movement thereof.

20. An apparatus for producing images of various sizes on photosensitive film, comprising a base, a platform movable relative to the base for supporting the photosensitive film in a plane in fixed proximal relationship to a photographic image to expose a portion of the film to a light source to produce an image on the film of generally the same size as the photographic image, a control arm for carrying the platform in fixed relationship thereto, the control arm including at least one control surface having a defined shape, a resilient control linkage interconnecting the control arm and the base to allow random movement of the platform in the plane relative to the photographic image, moving means engaging the control arm to move the control surface and platform, movement of the platform exposing a greater portion of the film to the light source to vary the size of the image produced on the film, and control means for adjustably controlling the movement of the platform, the control means including a control member for engaging the control surface and means for adjusting the position of the control member relative to the control surface to define a path of movement and to selectively determine the degree of movement of the platform.

21. The apparatus as recited in claim 20 wherein the control arm includes a second control surface, and the means for moving the platform in the defined path includes a second control member for engaging the second control surface, propelling means coupled to the second control member for moving the second control member on the second control surface to move the platform, and means for biasing the second control member into engagement with the second control surface to cause the first control surface to continuously engage the first control member, the platform being moved in a defined path determined by the coaction between the first control member and first control surface.

22. The apparatus as recited in claim 21 wherein the control arm includes first and second protruding tongues, each of the tongues including a circular opening having an inner control surface, the first control member including a tapered portion and means for axially moving the tapered portion relative to the opening of the first tongue to vary the degree of movement of the control arm, the second control member including a control lever for continuously engaging the inner control surface of the opening of the second tongue to cause the inner surface of the opening in the first tongue to continuously engage the tapered portion of the first control member.

* * * * *